United States Patent [19]
Takahashi et al.

[11] Patent Number: 6,001,917
[45] Date of Patent: Dec. 14, 1999

[54] METHOD FOR PREPARING HEAT-CURABLE SILICONE RUBBER COMPOUNDS

[75] Inventors: Masaharu Takahashi, Gunma-ken; Yutaka Hagiwara, Annaka; Minoru Igarashi, Gunma-ken; Keiji Shibata, Annaka, all of Japan

[73] Assignee: Shin-Etsu Chemical Co., Ltd., Tokyo, Japan

[21] Appl. No.: 09/109,967

[22] Filed: Jun. 27, 1998

[30] Foreign Application Priority Data

Jun. 27, 1997 [JP] Japan ..................................... 9-187579

[51] Int. Cl.$^6$ ........................................................ C08K 3/00

[52] U.S. Cl. ........................... 524/492; 523/346; 523/351; 523/353; 524/493

[58] Field of Search ..................................... 523/346, 351, 523/353; 524/492, 493

[56] References Cited

U.S. PATENT DOCUMENTS 3,951,389  4/1976  Porter .
4,300,841  11/1981  Richards .

FOREIGN PATENT DOCUMENTS 64-56736  3/1989  Japan .

*Primary Examiner*—Edward J. Cain
*Attorney, Agent, or Firm*—Millen, White, Zelano & Branigan, P.C.

[57] ABSTRACT

In a first step, basic components including (A) 100 parts by weight of an organopolysiloxane gum, (B) 5–100 parts by weight of a reinforcing silica filler, and (C) 0.1–30 parts by weight of a processing aid are fed batchwise to a closed mixer for mixing them at a temperature of room temperature to 150° C. In a second step, the mixture is fed into a kneader/mixer for heat treating at a temperature of 150–250° C. The first step achieves quick dispersion and cooperates with the second step to form a heat-curable silicone rubber compound in an efficient manner.

2 Claims, No Drawings

METHOD FOR PREPARING HEAT-CURABLE SILICONE RUBBER COMPOUNDS

BACKGROUND OF THE INVENTION

1. Field of the Invention

This invention relates to a method for preparing heat-curable silicone rubber compounds in a well dispersed state and at high throughput rates.

2. Prior Art

Heat-cured silicone rubber is improved in weather resistance, durability, heat resistance, physiological activity and colorability. It is used in a variety of applications including building materials, electronic materials, electric materials, business machine parts, automotive parts, and medical parts.

Known methods for preparing heat-curable silicone rubber are to uniformly mix ingredients in compounders. Such compounders include a large size mixer having a pair of mixing blades in a chamber such as a kneader/mixer, a kneader having a pair of rotors in a chamber whereby the contents are kneaded while applying pressure from above to compress the contents such as an internal mixer or Banbury mixer, and a kneader/extruder capable of continuous kneading such as a twin-screw extruder.

Most customarily, large size kneader/mixers having a pair of mixing blades in a chamber are used. The kneader/mixers have the advantage that a large amount of mass can be produced in a single pass on account of its maximum capacity reaching several thousands of liters, but the drawbacks that a long time is needed until the mixture becomes homogeneous and a fully dispersed state is not readily obtainable.

A satisfactory uniform state is reached within a short period of time if a closed mixing apparatus such as a Banbury mixer as illustrated in U.S. Pat. No. 3,951,389 is used. The mixing apparatus of this type, however, has as small a capacity as about several hundreds of liters at maximum. U.S. Pat. No. 4,300,841 discloses a method of compounding a silicone polymer with a filler by mixing the ingredients in a high speed rotation mixer into uniform powder particles and thereafter, mixing the powder in rolls. This method is not applicable when heat treatment is necessary. A continuous production method using a kneader/extruder is disclosed in JP-A 56736/1989. A short working time enables efficient continuous production, but the method results in compounds of variant quality.

It was thus difficult in the prior art to produce heat-curable silicone rubber compounds having improved dispersion and consistent quality within a short time and in an efficient manner.

SUMMARY OF THE INVENTION

Therefore, an object of the present invention is to provide a novel and improved method for the efficient preparation of a heat-curable silicone rubber compound in which ingredients are homogeneously mixed and dispersed.

We have found that by first feeding basic components including an organopolysiloxane gum, a reinforcing silica filler, and a processing aid to a batchwise closed mixer for mixing them at a temperature of up to 150° C., and then feeding the mixture into a kneader/mixer for mixing and heat treating it at a temperature of 150 to 250° C., a heat-curable silicone rubber compound in a fully dispersed state can be prepared at a high throughput rate.

The invention provides a method for preparing a heat-curable silicone rubber compound, comprising a first step of feeding basic components including (A) 100 parts by weight of an organopolysiloxane gum, (B) 5 to 100 parts by weight of a reinforcing silica filler, and (C) 0.1 to 30 parts by weight of a processing aid to a batchwise closed mixer for mixing them at a temperature of up to 150° C., and a second step of feeding the mixture of the first step into a kneader/mixer for heat treating at a temperature of 150 to 250° C.

DETAILED DESCRIPTION OF THE INVENTION

Basic components of the heat-curable silicone rubber compound to be prepared by the method of the invention are (A) an organopolysiloxane gum, (B) a reinforcing silica filler, and (C) a processing aid.

The organopolysiloxane gum as component (A) is preferably a linear high viscosity organopolysiloxane of the general formula (1).

$$R^2(R^1_2SiO)_nSiR^1_2R^2 \qquad (1)$$

In formula (1), $R^1$ is selected from substituted or unsubstituted monovalent hydrocarbon groups having 1 to 10 carbon atoms, preferably 1 to 6 carbon atoms. Included are unsubstituted hydrocarbon groups, for example, alkyl groups such as methyl, ethyl, propyl, butyl, pentyl, hexyl, octyl, decyl and dodecyl, alkenyl groups such as vinyl, allyl and butenyl, aryl groups such as phenyl and tolyl, and aralkyl groups such as benzyl and β-phenylethyl, and substituted hydrocarbon groups in which some or all of the hydrogen atoms in the foregoing groups are replaced by halogen atoms or cyano groups, such as 3,3,3-trifluoropropyl and cyanoethyl. $R^2$ is selected from methyl, vinyl and hydroxyl groups. Letter n is a number of at least 1,000, preferably 3,000 to 20,000.

With the properties of silicone rubber taken into account, it is preferred that at least 50 mol % of the entire $R^1$ and $R^2$ groups be methyl and 0.025 to 0.5 mol %, especially 0.05 to 0.3 mol % of the entire $R^1$ and $R^2$ groups be vinyl.

Component (B) is a reinforcing silica filler which is selected, for example, from fumed silica, fired silica, precipitated silica and mixtures thereof. The silica fillers may have been surface treated with suitable agents, for example, linear organopolysiloxanes, cyclic organopolysiloxanes, hexamethyldisilazane and reactive silanes. Since the reinforcing silica filler becomes expensive on account of the surface treatment, such surface treatment is unnecessary unless it is desired to impart special properties. From the standpoints of transparency and reinforcement of the reinforced silicone rubber, fumed silica having a specific surface area of 100 to 400 $m^2/g$ is desirable. From the standpoints of cost, elasticity and physical properties of the reinforced silicone rubber, reinforcing precipitated silica having a specific surface area of 50 to 800 $m^2/g$ is especially desirable.

An appropriate amount of the reinforcing silica filler blended is 5 to 100 parts by weight, preferably 10 to 50 parts by weight, per 100 parts by weight of organopolysiloxane (A). Outside this range, less or larger amounts of the filler result in silicone rubber compositions which have poor properties and cure into rubber parts having insufficient mechanical strength (such as tensile strength and tear strength).

Component (C) is a processing aid for improving the dispersibility of the reinforcing silica filler (B) in the silicone rubber and imparting various desirable properties to the silicone rubber. The processing aid used herein is typically represented by the general formula (2).

$$R^4O\text{—}(R^3{}_2SiO)_m\text{—}R^4 \quad (2)$$

In formula (2), $R^3$ is as defined for $R^1$. Preferably $R^3$ is selected from the group consisting of methyl, vinyl, phenyl, and 3,3,3-trifluoropropyl. $R^4$ is selected from the group consisting of methyl, ethyl and hydrogen. Letter m is an integer of up to 100, preferably 2 to 50.

An appropriate amount of the processing aid blended is 0.1 to 30 parts by weight per 100 parts by weight of organopolysiloxane (A). The processing aids may be used alone or in admixture of two or more.

In the silicone rubber compound according to the invention, there may be added additives if necessary. Such additives include fillers such as ground quartz, diatomaceous earth, calcium carbonate, iron oxide, zinc oxide, titanium oxide, carbon black, barium oxide, magnesium oxide, cerium hydroxide, magnesium carbonate, zinc carbonate, asbestos, glass wool, finely divided mica, and fused silica powder; pigments; heat resistance modifiers such as fatty acid salts of metal oxides; flame retardants such as platinum compounds; and agents for preventing cured products from coloring such as organohydrogenpolysiloxanes.

Now the method of the invention is described. In the first step, the above-described components are fed to a batchwise closed mixer where they are mixed until a homogeneous mixture is obtained. If desired, the batchwise closed mixer has a cooling or heating function so that the internal temperature during mixing may be maintained in the range from room temperature to about 150° C., more preferably from about 50° C. to about 120° C. As compared with kneader/mixers, the batchwise closed mixer has the advantage that a fully dispersed state can be established within a short time.

The batchwise closed mixer is a mixer having a pair of rotors in a closed chamber wherein the contents are kneaded while applying pressure from above. Exemplary are Banbury mixers, internal mixers, intensive mixers, and intermix mixers.

The thus obtained mixture is fed to a kneader/mixer of the second step directly or through a transfer apparatus such as an extruder while heating. The kneader/mixer is preferably provided with a heating function using steam or another heating medium. In the kneader/mixer which is kept in vacuum or through which nitrogen gas or carbon dioxide gas is passed, the mixture is heat treated at a temperature of 150 to 250° C., preferably 150 to 200° C. At too low temperatures, the heat treatment requires a longer time. Too high temperatures can cause degradation of the silicone rubber compound.

In well-known methods for preparing silicone rubber compounds, a series of steps from mixing and homogenization of raw ingredients to heat treatment are carried out in a kneader/mixer. Since the kneader/mixer is rather incompetent in mixing and homogenization operation, the present invention carries out mixing and homogenization in a batchwise closed mixer capable of achieving homogenization within a short time, as the first step. In the kneader/mixer of the second step, only heat treatment is carried out. The two steps are assigned to the respective mixers, which leads to an increased throughput rate.

The mixture in the kneader/mixer is usually discharged therefrom by turning the kneader/mixer down. If a kneader/mixer which is provided at the bottom with a discharge function as by means of an extruding screw is used in the second step for effecting heat treatment, the desired silicone rubber compound can be continuously discharged, achieving a significantly improvement in productivity. In one preferred embodiment, the mixture obtained in the closed mixer of the first step can be continuously metered to the kneader/mixer of the second step by means of a transfer apparatus such as an extruder, and after it is subjected to the desired heat treatment in the kneader/mixer, it can be continuously discharged therefrom.

Since the first step is such that the components fed are mixed into a homogeneous mixture by means of a batchwise closed mixer, the components are well dispersed, which contributes to improvements in the working efficiency and cured properties of the silicone rubber compound.

EXAMPLE

Examples are given below together with comparative examples to illustrate the invention, and are not intended to limit the scope thereof.

Example 1

To a Banbury mixer with a capacity of 75 liters, 50 kg of an organopolysiloxane gum end-blocked with a dimethylvinylsiloxy group, consisting of 0.15 mol % of methylvinylsiloxy units and 99.85 mol % of dimethylsiloxy units, and having an average degree of polymerization of about 8,000, 20.5 kg of wet silica having a specific surface area of about 200 m²/g (Nipsil LP by Nippon Silica K.K.), 2 kg of a linear dimethylsiloxane blocked with a silanol group at each end and having an average chain length of 3 to 4, and 0.05 kg of vinyltrimethoxysilane were fed. The components were kneaded for about 5 minutes under pressure by means of a floating weight. In this way, the components were mixed into a homogeneous mixture which had a temperature of 105° C. The mixture was then fed to a preheated kneader/mixer with a capacity of 200 liters. While nitrogen was passed through the kneader/mixer at a flow rate of 5 Nm³/hr, the mixture was heated over 1 hour to a temperature of 170 to 190° C. and heat treated at the temperature for 1 hour, obtaining a silicone rubber compound.

Using a roll mill, 100 parts by weight of this base compound was uniformly compounded with 0.5 part by weight of an organic peroxide, 2,5-dimethyl-2,5-di(t-butylperoxy)-hexane. The compound was press cured at 165° C. for 10 minutes and post cured at 200° C. for 4 hours, obtaining a silicone rubber sheet of 2 mm thick. The sheet was examined by physical tests according to JIS K6301.

Example 2

The kneading by the Banbury mixer in Example 1 was repeated three times, obtaining about 210 kg of the mixture. An about 70-kg portion of the mixture was fed to a kneader/mixer with a capacity of 200 liters which was provided at its bottom with a discharging screw means. The mixture fed into the 200-liter kneader/mixer was heated in a nitrogen flow of 5 Nm³/hr and heat treated at 170 to 190° C. From the point of time when 1 hour had passed at the temperature of 170 to 190° C., the remainder of the mixture was continuously metered at a feed rate of 70 kg/hr over 2 hours from the Banbury mixer to the kneader/mixer by means of a single screw extruder having a diameter of 75 mm while heating it. At the same time, the mixture as heat treated was continuously discharged from the bottom of the kneader/mixer at a rate equal to the feed rate to the kneader/mixer, obtaining a silicone rubber compound.

The average residence time in the kneader/mixer was about 1 hour as computed from the above parameters. The compound was examined by physical tests as in Example 1.

Example 3

A silicone rubber compound was obtained as in Example 2 except that the feed rate of the mixture to the kneader/ mixer and the discharge rate from the kneader/mixer were about 35 kg/hr, and the average residence time in the kneader/mixer was about 2 hours. The compound was examined by physical tests as in Example 1.

Comparative Example 1

The same basic components as used in Example 1 were fed to a kneader/mixer where they were kneaded in a nitrogen flow of 5 Nm$^3$/hr at a temperature of 50 to 100° C. for about 1.5 hours to form a homogeneous mixture. Thereafter, the mixture was heated to a temperature of 170 to 190° C. and heat treated at the temperature for 1 hour, obtaining a silicone rubber compound. A series of these steps took about 4 hours. The compound was examined by physical tests as in Example 1.

Comparative Example 2

The same basic components as used in Example 1 were fed to a kneader/mixer where they were kneaded in a nitrogen flow of 5 Nm$^3$/hr at a temperature of 50 to 100° C. for about 0.5 hour to form a homogeneous mixture. Thereafter, the mixture was heated to a temperature of 170 to 190° C. and heat treated at the temperature for 0.5 hour, obtaining a silicone rubber compound. A series of these steps took about 2 hours. The compound was examined by physical tests as in Example 1.

The results of Examples 1–3 and Comparative Examples 1–2 are shown in Table 1.

hardness and a substantial difference in hardness between the press-cured and post-cured states, and showed unstable properties when merely press cured.

Example 4

To a Banbury mixer with a capacity of 75 liters, 50 kg of an organopolysiloxane gum end-blocked with a dimethylvinylsiloxy group, consisting of 0.15 mol % of methylvinylsiloxy units and 99.85 mol % of dimethylsiloxy units, and having an average degree of polymerization of about 8,000, 21.5 kg of wet silica having a specific surface area of about 200 m$^2$/g (Nipsil LP by Nippon Silica K.K.), 0.5 kg of a linear dimethylsiloxane blocked with a silanol group at each end and having an average chain length of 3 to 4, and 1.8 kg of methylhydrogenpolysiloxane end-blocked with a trimethylsiloxy group and having an average degree of polymerization of about 40 were fed. The components were kneaded for about 5 minutes under pressure by means of a floating weight. In this way, the components were mixed into a homogeneous mixture which had a temperature of 90° C. The mixture was then fed to a preheated kneader/mixer with a capacity of 200 liters. While nitrogen was passed through the kneader/mixer at a flow rate of 5 Nm$^3$/hr, the mixture was heated over 1 hour to a temperature of 170 to 180° C. and heat treated at the temperature for 1.5 hours. While the mixture as heat treated was cooled over 0.5 hour, 100 g of calcium stearate and 0.25 kg of a linear dimethylsiloxane having an average chain length of 3 to 4 were added and mixed therewith, obtaining a silicone rubber compound.

TABLE 1

|  |  | E1 | E2 | E3 | CE1 | CE2 |
|---|---|---|---|---|---|---|
| Components | Organopolysiloxane gum (kg) | 50 | 50 | 50 | 50 | 50 |
|  | Wet silica (kg) | 20.5 | 20.5 | 20.5 | 20.5 | 20.5 |
|  | Silanol-terminated dimethylsiloxane (kg) | 2 | 2 | 2 | 2 | 2 |
|  | Vinyltrimethoxy-silane (kg) | 0.05 | 0.05 | 0.05 | 0.05 | 0.05 |
| Tests | Hardness as press-cured | 51 | 48 | 50 | 51 | 54 |
|  | as post-cured | 53 | 50 | 52 | 53 | 59 |
|  | Tensile strength (kgf/cm$^2$) | 83 | 80 | 82 | 85 | 75 |
|  | Elongation (%) | 340 | 320 | 330 | 350 | 420 |
| Apparatus |  | 75-liter Banbury mixer ↓ | 75-liter Banbury mixer ↓ | 75-liter Banbury mixer ↓ | kneader/mixer | kneader/mixer |
|  |  | 200-liter kneader/mixer | 200-liter kneader/mixer with bottom discharge function | 200-liter kneader/mixer with bottom discharge function |  |  |
| Residence time in kneader/mixer (hr) |  | 2 | 1 | 2 | 4 | 2 |
| Throughput (kg/hr) |  | ~35 | ~70 | ~35 | ~17 | ~35 |

As is evident from Table 1, a comparison between Examples and Comparative Examples reveals that the invention is successful in producing a large quantity of silicone rubber compound having equivalent cured properties within a short period of time. Although Comparative Example 2 relying on the prior art kneader method achieved an equivalent throughput to Example 1, the cured rubber had a high Comparative Example 3

A silicone rubber compound was prepared by the same procedure as Example 4 except that the mixing and homogenization by the Banbury mixer in Example 4 was carried out by the kneader/mixer, and the heat treatment was effected at 170 to 190° C. for 2 hours. A series of these steps took 4.5 hours.

For the silicone rubber compounds of Example 4 and Comparative Example 3, silicone rubber sheets were prepared and tested by the same procedures as in Example 1. They were also examined for stretching fatigue. The results are shown in Table 2.

Stretching fatigue test

A rubber sheet was subject to cycles of 100% elongation stretching at a frequency of 30 cycles per minute. The number of cycles until rubber sheet failure was counted.

TABLE 2

|  | E4 | CE3 |
|---|---|---|
| Components |  |  |
| Organopolysiloxane gum (kg) | 50 | 50 |
| Wet silica (kg) | 21.5 | 21.5 |
| Silanol-terminated dimethylsiloxane (kg) | 0.5 | 0.5 |
| Methylhydrogen-polysiloxane (kg) | 1.8 | 1.8 |
| Calcium stearate (kg) | 0.1 | 0.1 |
| Linear dimethylsiloxane (kg) | 0.25 | 0.25 |
| Tests |  |  |
| Hardness | 50 | 51 |
| Tensile strength (kgf/cm$^2$) | 75 | 73 |
| Elongation (%) | 320 | 310 |
| Stretching fatigue ($\times 10^4$ cycles) | 60 | 30 |
| Apparatus | 75-liter Banbury mixer ↓ 200-liter kneader/mixer | 200-liter kneader/mixer |
| Residence time in kneader/mixer (hr) | 3 | 4.5 |
| Throughput (kg/hr) | ~23 | ~15 |

Example 4 shows a better result in the stretching fatigue test, which indicates a better dispersion of the components in the silicone rubber compound of Example 4. A comparison between Example 4 and Comparative Example 3 reveals that the invention is successful in producing a large quantity of silicone rubber compound having equivalent cured properties within a short period of time.

According to the invention, a large quantity of silicone rubber compound having components fully dispersed can be produced within a short period of time.

Japanese Patent Application No. 187579/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A method for preparing a heat-curable silicone rubber compound, comprising:

a first step of feeding basic components to a batchwise closed mixer for mixing them at a temperature of up to 150° C., said basic components including (A) 100 parts by weight of an organopolysiloxane gum, (B) 5 to 100 parts by weight of a reinforcing silica filler, and (C) 0.1 to 30 parts by weight of a processing aid, and a second step of feeding the mixture of the first step into a kneader/mixer for heat treating at a temperature of 150 to 250° C.

2. The method of claim 1 wherein the first step is at a temperature of 50 to 120° C. and the second step is at a temperature of 150 to 200° C.

* * * * *